(12) United States Patent  
Suenbuel (10) Patent No.: US 7,427,023 B2  
(45) Date of Patent: Sep. 23, 2008

(54) PERSONALIZED TRANSACTION ASSISTANCE WITH SENSOR NETWORKS

(75) Inventor: Asuman Suenbuel, San Jose, CA (US)

(73) Assignee: SAP AG, Walldorf (DE)

( * ) Notice: Subject to any disclaimer, the term of this patent is extended or adjusted under 35 U.S.C. 154(b) by 316 days.

(21) Appl. No.: 11/259,155

(22) Filed: Oct. 27, 2005

(65) Prior Publication Data

US 2007/0095903 A1 May 3, 2007

(51) Int. Cl.  
*G06K 15/00* (2006.01)
(52) U.S. Cl. .................. 235/383; 235/375; 235/385; 705/26; 705/27; 705/28
(58) Field of Classification Search .............. 235/383, 235/385, 375, 380, 381, 376, 470; 705/26–28  
See application file for complete search history.

(56) References Cited

U.S. PATENT DOCUMENTS

| 5,544,321 | A | 8/1996 | Theimer et al. |
| 6,091,956 | A | 7/2000 | Hollenberg |
| 7,155,405 | B2 * | 12/2006 | Petrovich ................ 705/26 |
| 2005/0075954 | A1 * | 4/2005 | Matsumoto et al. ........ 705/28 |
| 2005/0177463 | A1 | 8/2005 | Crutchfield, Jr. et al. |
| 2005/0256781 | A1 * | 11/2005 | Sands et al. ............. 705/26 |

FOREIGN PATENT DOCUMENTS

| DE | 100 49 920 | 5/2002 |
| EP | 1 550 971 | 7/2005 |
| FR | 2 813 470 | 3/2002 |

OTHER PUBLICATIONS

Chavez et al., "Interactive applications of personal situation-aware assistants," *Computers & Graphics*, Pergamon Press, Oxford, GB, Dec. 1999, 23(6): 903-915.

'SAMoA: An experimental platform for Situation-Aware Mobile Assistance' [online]. Chavez, 1998, [retrieved on Jul. 15, 2001]. Retrieved from the Internet: <URL: www.rostock.igd.fhg.de/{imc98/proceedings.html>, 6 pages.

Gregory T. Huang, "less Sensor Net," Jul./Aug. 2003, Technology Review, pp. 51-56.

(Continued)

*Primary Examiner*—Edwyn Labaze  
(74) *Attorney, Agent, or Firm*—Fish & Richardson P.C.

(57) ABSTRACT

In order to provide personalized transaction assistance using sensor networks, a user interacts with the sensor networks within, for example, a retail environment, using a wireless mobile device. The user is provided with timely, convenient, and personalized information related to products for sale within the retail environment. More specifically, for example, a message exchange between the sensor network and the mobile device is automatically initiated, such that the user is provided with information regarding, for example, an availability, description, price, and/or location of products in which the user has previously expressed a purchase interest. In this way, a probability of a sale is increased for the retail environment, as well as a likelihood that the user will be happy with the purchase experience, and these benefits are provided with a minimal amount of effort required of the user.

19 Claims, 7 Drawing Sheets

OTHER PUBLICATIONS

Intel Research—Exploratory Research—Deep Networking, Intel® Mote, reprinted from http://www.intel.com/research/exploratory/motes.htm printed on Oct. 21, 2004, pp. 1-6.

Intel Research—Exploratory Research—Deep Networking, Heterogeneous Sensor Networks, reprinted from http://www.intel.com/research/exploratory/heterogeneous.htm printed on Oct. 21, 2004, pp. 1-10.

Smart-Its Particles, http://particle.teco.edu/whatisitgoodfor.html, "Overview of the Particle Computer System," (4 pages), Aug. 2004.

* cited by examiner

| ITEM TYPE 702 | BRAND 704 | MODEL # 706 | SIZE 708 | PREFERRED PRICE 710 | ITEM ON PROMOTION 712 |
|---|---|---|---|---|---|
| DIGITAL CAMERA | BRAND X | 502 | SMALL | $400 | N |
| LAPTOP | BRAND Y | 600M | SMALL | $1000 | N |
| TV | BRAND Z | — | BIG | $200 | Y |
| iPOD™ | BRAND W | 40 GB | SMALL | $300 | Y |

PERSONALIZED TRANSACTION ASSISTANCE WITH SENSOR NETWORKS

TECHNICAL FIELD

This disclosure relates to wireless networks, and, more particularly, to networks and wireless mobile devices.

BACKGROUND

A wireless sensor network is formed by a collection of sensor nodes that are linked by a wireless medium to perform distributed sensing tasks. Wireless sensor networks are deployed in a variety of environments to perform tasks such as surveillance, widespread environmental sampling, security, and health monitoring. The sensor networks typically transmit their sensor data to a backend system for associated processing of collected data.

SUMMARY

This disclosure describes providing personalized transaction assistance using sensor networks.

According to one general aspect, a system includes a sensor network that includes a plurality of sensor nodes that are dispersed over a region, each sensor node being operable to determine local environmental information. A memory is in communication with the sensor network that is operable to store transaction information associated with the region. A user-detecting node includes one of the plurality of nodes within the sensor network, and is operable to compare the transaction information from the memory with a user preference list obtained from a mobile device within the local environment of the user-detecting node, and is further operable to output a preference-matched subset of the transaction information to the mobile device.

Implementations may include one or more of the following features. For example, the user-detecting node may be operable to poll for a signal transmitted by the mobile device, and may be further operable to initiate a message exchange with the mobile device in order to obtain the user preference list, based on the signal.

In another example, the transaction information may include items for sale within the region, the user preference list may include items for purchase, and the preference-matched subset may include ones of the items for sale that coincide with the items for purchase. The user-detecting node may be operable to output directions to the items of the preference-matched subset, with respect to the local environment of the user-detecting node. Furthermore, the user-detecting node may be operable to output directions to the items of the preference-matched subset, with respect to the region defined by the sensor network. The user-detecting node may be operable to communicate with other ones of the plurality of sensor nodes in order to output the directions with respect to the region.

The preference-matched subset of the transaction information may include a description of the items for sale that coincide with the items for purchase. The preference-matched subset of the transaction information also may include a description of a substitute item for sale that is determined to be similar to one of the items for purchase. The mobile device may include a selector application that is operable to select items for the user preference list from publicly-available item listings.

In still another example, the user-detecting node may be operable to communicate with an external memory to provide the preference-matched subset of the transaction information, and the external may be associated with a local server computer, a back-end enterprise system, or one of the other ones of the plurality of sensor nodes.

In another general aspect, a method includes detecting a presence of a mobile device within a vicinity of a sensor node that is one of a plurality of sensor nodes of a sensor network, accessing preference information stored in association with the mobile device, and accessing environment information that is associated with an environment of the sensor network. Environment information is matched with the preference information to determine preference-matched information, and the preference-matched environment information is outputted to the mobile device.

Implementations may include one or more of the following features. For example, detecting the presence of the mobile device may include detecting a signal transmitted by the mobile device. Accessing the preference information may include conducting a message exchange in which the preference information stored on the mobile device is received at the sensor node.

In another case, accessing environment information may include accessing item information for items for sale within the environment of the sensor network. Additionally, matching the environment information with the preference information to determine preference-matched information may include matching the items for sale with items for purchase that are included in the preference information, and determining the preference-matched information to include ones of the items for sale that coincide with the items for purchase. Furthermore, outputting the preference-matched environment information may include outputting directions, within the environment of the sensor network, to the ones of the items for sale that coincide with the items for purchase.

In another general aspect, an apparatus with a storage medium has instructions stored thereon. The instructions include a first code segment associated with a sensor node of a sensor network. The first code segment causes the apparatus to access item information regarding items for sale in a retail environment. A second code segment is associated with the sensor node and causes the apparatus to receive an item list from a mobile device, where the item list reflects a preference of a user of the mobile device. A third code segment causes the apparatus to compare the item information with the item list to obtain preference-matched item information, and a fourth code segment causes the apparatus to output the preference-matched item information to the mobile device.

Implementations may include one or more of the following features. For example, the first code segment may include a fifth code segment for communicating with another one of a plurality of sensor nodes within the sensor network, or with an external application, to obtain the item information.

The fourth code segment may include a fifth code segment for outputting descriptive information regarding a nature or location of an item in the preference-matched item information. Additionally or alternatively, the fourth code segment may include a fifth code segment for outputting a notification event to the mobile device when the mobile device is in a vicinity of an item from the preference-matched item information.

The details of one or more implementations are set forth in the accompanying drawings and the description below. Other features and advantages will be apparent from the description and drawings, and from the claims.

DETAILED DESCRIPTION

Figure 1:
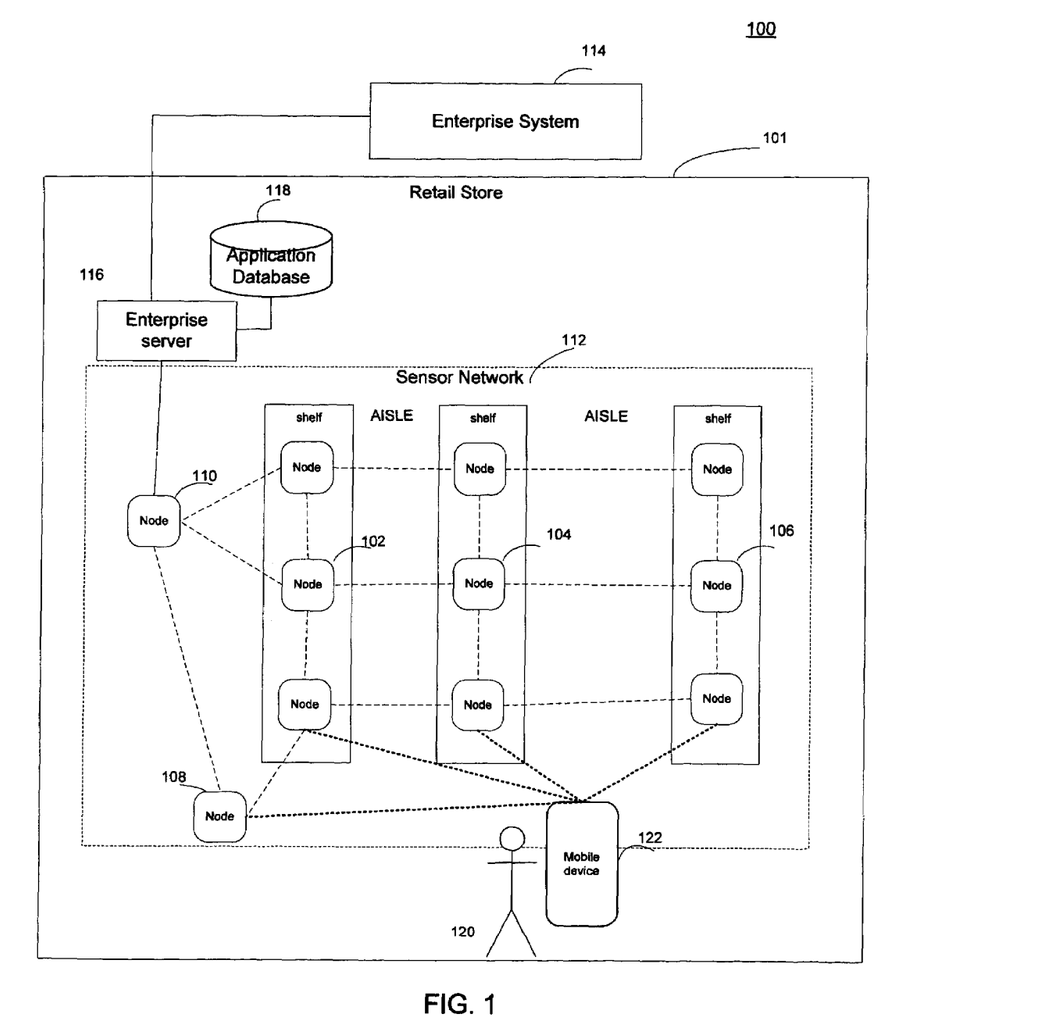
FIG. 1 is a block diagram of a system allowing a user to interact with a sensor network within a retail store environment via a mobile device.

FIG. 1 is a block diagram of a system 100 allowing a user 120 to interact with a sensor network 112 within a retail store environment 101, using a wireless mobile device 122. The system 100 serves to provide the user 120 with timely, convenient, and personalized information related to products for sale within the retail environment 101.

More specifically, for example, the system 100 automatically initiates a message exchange between the sensor network 112 and the mobile device 122, such that the user 120 is provided with information regarding, for example, an availability, description, price, and/or location of products in which the user 120 has previously expressed a purchase interest. In this way, a probability of a sale is increased for the retail environment, as well as a likelihood that the user 120 will be happy with the purchase experience, and these benefits are provided with a minimal amount of effort required of the user 120.

The mobile device 122 may be, for example, a cell phone, a personal digital assistant (PDC), a laptop computer, or any other type of mobile wireless computing device. The mobile device 122 may communicate with the sensor network 112 in a variety of ways, as described in more detail below, but which may include, for example, the use of wireless networking protocols (e.g., the 802.11 family of specifications), Bluetooth technology, or other wireless communication techniques.

The mobile device 122 stores, or otherwise has access to, information about what the user 120 desires to purchase. For example, such purchase information may include a list of products, where the list may be specific to the particular retail environment 101, or may be specific to a designated list of multiple retail environments, or may identify products by, for example, product identification codes, without regard to any particular retail environment. Specific examples of implementations of such stored purchase information, including how the purchase information may be obtained, stored, and shared, are discussed in more detail below.

The sensor network 112 stores, or otherwise has access to, product information related to products that are for sale within the retail environment 101. Such product information may include, for example, a general description of the product, a price of the product, an availability of the product, a location of the product within the retail environment 101, or, in case the product is not (currently) available, a potential substitute purchase and/or information as to when the product will become available.

As referenced above, the sensor network 112 and the mobile device 122 may interact in a number of ways in order to compare the general product information of the retail environment, as accessed by the sensor network 112, with the purchase information of the mobile device 122 of the user 120. In this way, the sub-set of the product information that may be of interest to the particular user 120 may be provided to the user 120, along with related information, with minimal effort or involvement of the user 120.

For example, the mobile device 122 may be configured to broadcast the purchase information within the retail environment 101. The sensor network 112 in the retail environment 101 may thus collect the purchase information from the mobile device 122, compare the purchase information to any available product information, and transmit matching ones of the products to the mobile device 122, for consideration thereof by the user 120.

Such a broadcasting of information from the mobile device 122 may be configured to occur essentially constantly, or at an initiation of the user 120. In other implementations, such broadcasting may occur in response to a detection of the mobile device by the sensor network 112, and/or in response to a signal received at the mobile device 122 from the sensor network 112.

The sensor network 112 in FIG. 1 includes a distributed collection of sensor nodes 102, 104, 106, 108, and 110 that communicate to form the sensor network 112. The sensor nodes 102-110 may, for example, be mounted on a shelf (or shelves) 126 in the retail environment 101, as shown, and there may be one or more sensor nodes on the same shelf in different sections, as also shown. Each sensor node 102-110 is an electronic device that may have processing, sensing, and/or communication capabilities. The sensor nodes 102-110 may perform routing functions to create a multi-hop wireless networking fabric that relays data packets to a back-end system, such as, for example, an enterprise system 114 and/or enterprise server 116.

The sensor node 102-110 may include a memory configured to store information about items located on the shelf in proximity to the sensor node. The sensor node may communicate with the shelf 126, or a scanner on the shelf 126, or with the enterprise system 114, in order to have real-time information of what is on the shelf 126 at any given moment.

For example, the sensor node 102-110 may be notified (for example, by a scanner on the shelf, not specifically illustrated in FIG. 1) when an item is removed from the shelf. Upon notification, the sensor nodes 102-110 may update corresponding data storage with the item quantity and/or information about new items that are added in response to the removal of an item.

The sensor nodes 102-110 also may store data regarding a physical location of the sensor nodes 102-110 themselves (e.g., the aisle or section number of the shelf and the location at which the sensor node 102-110 is mounted). Geographic direction information from one sensor node to another sensor node, or to/from a landmark (e.g., the cashier counter or the customer service desk) may be stored, and provided to the user 120 by way of the mobile device 122.

In one example, the sensor node 102-110 processes the purchase information of the user (also referred to as a wish list, or an object list) on the individual sensor node itself, and notifies the user 120 when a desired item is on the shelf 126.

Such a sensor node may have the data and processing power to determine if an item on the wish list of the user 120 is in a vicinity of the sensor node.

For example, if the sensor node 102 is mounted on the detergent shelf of a retail environment, the sensor node 102 may have access to information that there are twenty bottles of BRAND X liquid detergent of 64 oz size with a price of $5.99. When the user 120 walks by the sensor node 102 with a wish list containing an entry for laundry detergent of BRAND X, the sensor node 102 may respond immediately by sending an alert message to the user 120, notifying the mobile device 122 that an item on a wish list of the mobile device is in stock and nearby.

In another example, the sensor node 102 may relay the received wish list to its neighboring sensor nodes 104-110. The wish list may traverse through the entire sensor network 112 until the wish list is transmitted to the enterprise system 114, where the wish list is processed. The processed result from the enterprise system 114 may be relayed back to the mobile device 122 through the sensor network 112.

In still another example, the sensor nodes 102-110 in the sensor network 112 may collectively process the wish list using the processing capability on-board the sensor nodes. 102-110. For example, each of the sensor nodes 102-110 may determine whether an item in the wish list is in its vicinity, and then pass the result, along with the wish list, to the next sensor node in a pre-defined chain of the nodes 102-110. After the wish list traverses through an entirety of the retail environment 101, a collective result may be provided that reflects all that could be found in the retail environment for the particular item, or for the wish list as a whole.

The enterprise system 114 may be a global, enterprise-level system that may control and communicate with multiple sub-systems that are local to each retail environment of the enterprise. The enterprise system 114 may, for example, decide global pricing of certain type of products, while the local sub-system may keep track of individual products and local inventory of the products. The local sub-system may be frequently accessed by the sensor network 112 in the retail environment 110 to provide services to the users in the store.

One example of such a local sub-system includes an enterprise server 116 and its local data storage, application database 118. The enterprise server 116 may be a general or special purpose computer that is connected through a network to the enterprise system 114. The enterprise server 116 may have the software application(s) and the processing power to process many wish lists, and find matching items for each wish list, and send the result back to the user 120 via the sensor network 112.

The enterprise server 116 may receive data associated with the retail environment 101 and store this data in the application database 118. Although only one application database 118 is shown in FIG. 1, the depicted single application database 118 represents any physical or virtual, centralized or distributed database suitable for the receipt and storage of files. The files can represent any kind of information, such as text, images, executables, or simply binary data. For example, the application database 118 may store detailed information of all items that are in the retail environment 101, the quantity of the same type of items, or an image of an item.

The enterprise sever 116 may communicate with all sensor nodes 102-110 in the retail environment 101, for example, to update the sale prices for items associated with a sensor node, or to send sensor nodes of the information of an item, (e.g. size, color and other information about the item) to assist in a processing of a wish list by the sensor nodes 102-110. The enterprise server 116 also may keep track of a physical location of each sensor node 102-110, and may provide routing information to any single sensor node 102-110 anywhere in the retail environment 101. In this way, the user 120 may obtain helpful information as to a presence, nature, and location of a desired item.

The enterprise server 116 and the sensor network 112 together may provide a service environment that helps the user 120 find desired items on the electronic wish list of the user 120. As referenced above, the mobile device 122 may contain one or more processor(s) and memory for processing and storing software and other data associated with the mobile device 122 or user 120. The mobile device 122 may communicate with the sensor network 112 wirelessly, and/or may use wireless services that the sensor network 112 provides.

In one implementation, the sensor network 112 may perform essentially a constant polling operation by which it attempts to detect a presence of any compatible mobile devices in its area. For example, the mobile device 122 may have some type of output, perhaps user-initiated, which may be detected by a surveillance of the sensor network 112. Once detected, the sensor network 112 may determine a wish list of purchase information of the user 120 stored in association with the mobile device 122, and then may seek to match this wish list against a list of items within the retail environment 101. As a result, the sensor network 112 may provide a list, if any, of available or alternative items within the retail environment 101 that match the items on the wish list of the user 120.

The mobile device 122 may include a user interface that allows the user to interact with the mobile device 122 to, for example, enter or update the wish list, or to report the findings of the sensor network 112. Further, the user interface may allow the user 120 to obtain directions to the found item(s), or to obtain more information related to the found item(s).

As described above, a shopping experience of a user may thus be enhanced. For example, the user 120 may purchase an item which the user 120 wanted, but was unaware of whether the item was in the store, or where the item was in the store. Also, the user 120 may enter an item onto the electronic wish list, and then, over time, forget that the item is listed there. Later, when the user 120 enters the retail environment 101 for a separate purchase, then the system 100 may remind the user 120 to purchase the item, which the user 120 otherwise may have forgotten.

Figure 2:
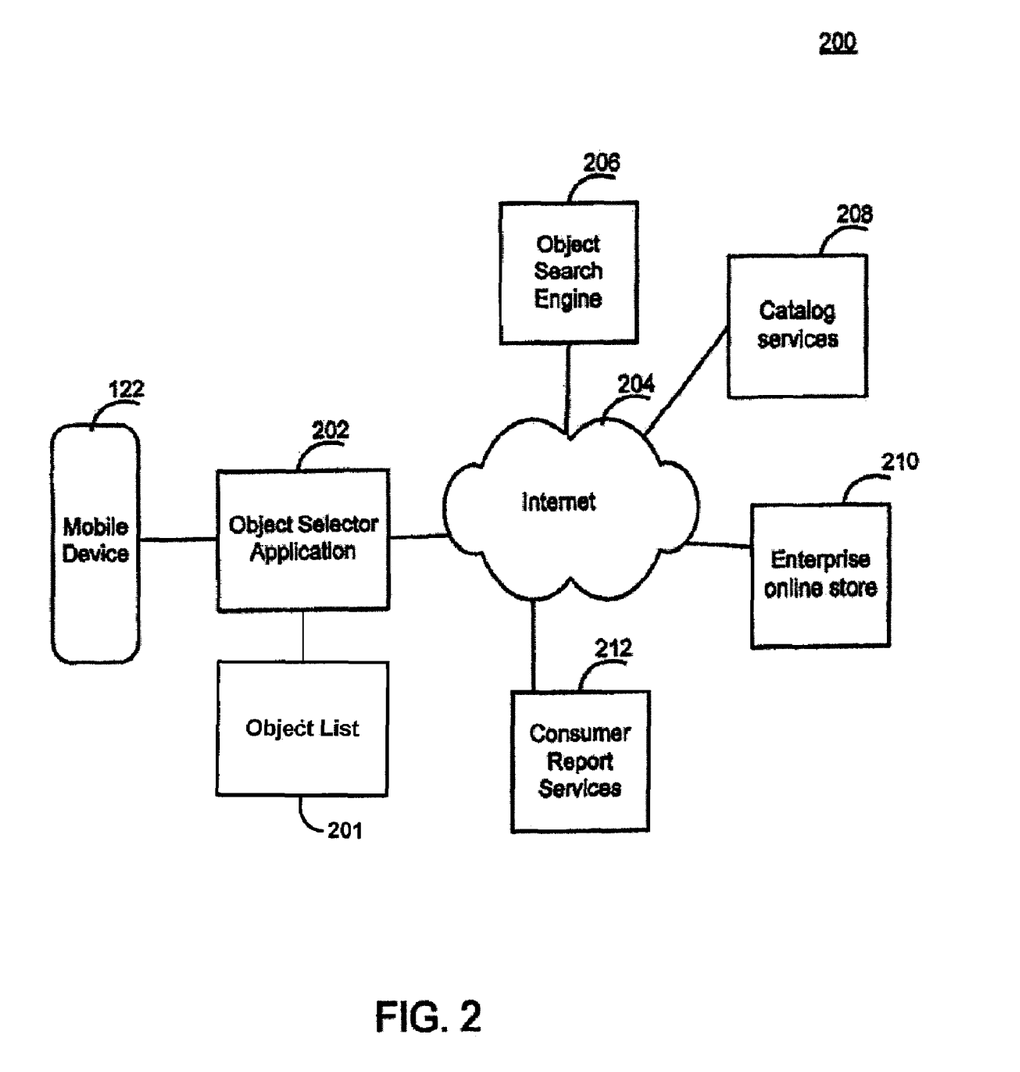
FIG. 2 is a block diagram of a system architecture allowing a user to populate a mobile device with an object list through interaction with one or more services.

FIG. 2 is a block diagram of a system architecture 200 for allowing the user 120 to populate the mobile device 122 with an object (wish) list 201. In one implementation, the mobile device 122 is configured to communicate with an object selector application 202 by connecting the mobile device 122 to a computer that hosts/runs the object selector application 202. In other implementations, the mobile device 122 may run the object selector application 202 itself.

The object selector application 202 provides, among other functions, a user interface that allows the user 120 to search and collect information about goods and services available on a network 204, such as the internet, and use the results to create the object list 201. The object selector application 202 may interact with an object search engine 206. The object search engine 206 may be, for example, a publicly-available search engine, or may be a customized search engine that is designed specifically for use with the object selector application 202, and/or the network 204.

The object search engine 206 may seek out and store information on a large number of the commercial products that are on the market. For example, enterprise systems of the retail environments may register their merchants to the object search engine 206. Manufactures also may register their products with the object search engine 206, and publish product information, as may distributors of the products. As a result, the object search engine 206 may have information regarding these publicized items, as well as information about where to find (and buy) them.

The object search engine 206 may find a list of items that matches one or more search key words entered by the user. The object search engine 206 may propose one or more products/items to the object selector application 202 based on the search criteria. The object selector application 202 may act as a client application that operates the object search engine 206 to browse objects, and/or to define and conduct object searches.

The object selector application 202 also may interact with various catalog services 208, which may include information made available from a product manufacturer's website. The user 120 may browse the catalog service 208 to find items from a particular manufacture or brand.

In yet another example, the enterprise online store 210 may be an online service that provides information on products that are available in a local retail environment that are part of a particular enterprise, or enterprise chain/franchise. The enterprise online store 210 may also allow the user 120 to special-order products, to be moved from one retail environment to another retail environment within the same enterprise.

For example, the enterprise online store 210 may represent a browser-accessible shopping website made available by the retail environment 101 of FIG. 1. In this way, for example, a user who is about to go to a physical location of a particular store, may first visit the catalog service 208 or the online store 210 associated with the store, perhaps to make sure that the items will be available and in-stock, and, if so, to download items from those sites to the mobile device 122.

The object selector application 202 also may be configured to receive information from a consumer information reporting service 212, so that quality and ratings information about products can be viewed during the process of creating or updating the object list 201. In this way, users may make informed decisions about which items to purchase, and, for example, may use such information to decide between suggested alternatives for items on the object list 201. For example, the consumer information reporting service may offer ratings and recommendations on products/services from an independent party, or from other customers.

Of course, there may be many other types of online services that may be available, and from which the user 120 may browse and select items. The object selector application 202 may collect item selections from these online sources and process the selected items into an organized object list 201.

The object list 201 includes one or more objects. An object appearing on the object list 201 may be an electronic representation of an item about which the user 120 has an interest. The object may be an instantiation of a data structure that includes detailed descriptions of the item, such as, for example, a record entry of an items table, with data fields that may include, for example, item name, item type, brand, model, and size.

In the implementations described above, the object list 201 generally represents a shopping list, or wish list, of the user 120, for products/items that the user 120 would like to purchase. In other implementations, however, the object list 201 may represent other types of information relating to the user that may be used in similar system as system 100, but perhaps implemented in different contexts.

For example, medical information about the user (e.g. blood type, or substances the user is allergic to, or current medications) may be used with a medical system in a hospital. That is, a user entering a hospital may automatically have such information appear on the mobile device 122, for review by the user 120 or by appropriate medical personnel.

As another example, information about the hobbies and interests of the user may be stored, and services or stores may use such information to suggest items for sale to the user 120. Additionally, or alternatively, objects on the object list 201 may represent a type of service that a business unit or enterprise may provide. For example, a car oil change service may use the information to suggest service options to the user. Similar comments apply to other services, such as, for example, a dry cleaning service, or a banking service.

As explained, the object selector application 202 is a software application with which the user 120 interacts to create the object list 201. The object selector application 262 may run on a stand-alone computer or computing device that connects to the mobile device 122. The object selector application 202 may then transfer the object list 201 created by the user 120 to the connected mobile device 122. Alternatively, as already mentioned, the object selector application 202 may run on the mobile device 122. In general, the object selector application 202 collects information about one or more items from multiple online sources; receives user selections of one or more items; processes the selected items' information to create the object list 201; and finally saves/transfers the object list 201 to the mobile device 122.

Additionally, or alternatively, the object selector application 202 may store a user profile that includes searches performed one or more times by the user. For example, the user profile may include searches for "newest music CD from band x," or "best selling book of the month." The object selector application 202 may, for example, search for these items periodically, or may search for these items automatically when the object selector application 202 starts, in order to provide the user 120 with a list of pre-selected or pre-selectable items.

As described above, the object selector application 202 may access and interact with one or more online services, including, for example, the object search engine 206, the catalog services 208, the enterprise online stores 210, and the consumer reporting services 212, to obtain information on products and services through the network 204. As mentioned, there are many other possibilities of online services with which the object selector application 202 may interact, and that allow the object selector application 202 to select and upload item information to create an object in the object list 201. The object selector application 202 may access each online service individually, or may have an integrated portal to access multiple online services. The details of examples of such processes are discussed further below, with respect to FIG. 4.

Figure 3:
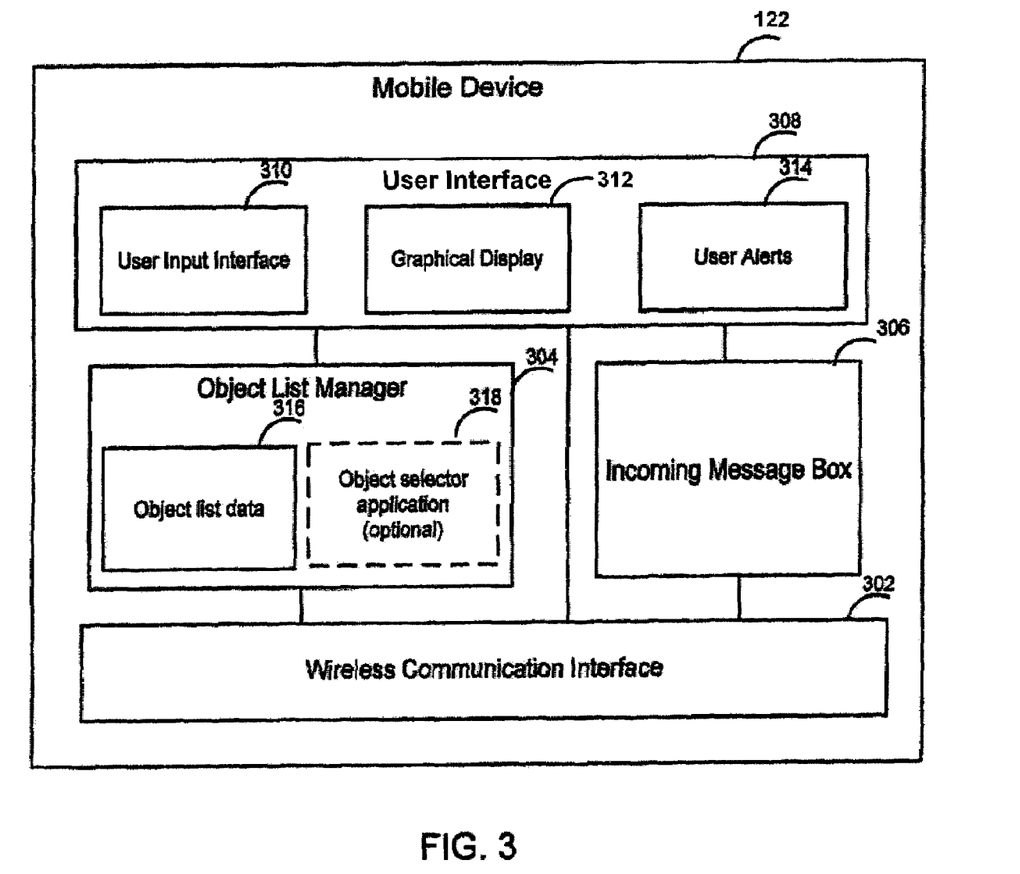
FIG. 3 is a diagram of a mobile device operable to create the object list and communicate the object list with a sensor network.

FIG. 3 is a block diagram of an example of the mobile device 122 in the context of the wireless system 100 shown in FIG. 1. The mobile device 122 is a wireless device that may communicate with the sensor network 112 in the retail environment 101, for example, by broadcasting the object list 201 of the user 120 to the sensor network 112, and by receiving feedback from the sensor network 112, such as, for example, messages/alerts from the sensor network 112 to notify the user 120 that an item on the object list 201 is close by.

The mobile device 122 also may be able to interact with the object selector application 202 to obtain the object list 201 of the user 120. The mobile device 122 also may provide the user 120 with an interface that allows the user 120 to browse or manage the object list 201, interact with the sensor network 112 and get notified or alerted of the findings of the sensor network 112. The mobile device 122 may be a specialized device designated for the wireless system 100 in FIG. 1, or may be a wireless device with additional features for the system 100 added on to an existing wireless device.

In FIG. 3, the mobile device 122 includes a wireless communication interface 302 that communicates with the sensor network 112. The wireless communication interface 302 may be a piece of hardware and/or software that is instrumental in connecting the mobile device 122 to the sensor network 112, and hence enable the mobile device 122 to communicate with the sensor network 112. The wireless communication interface 302 may broadcast its presence, so as to be detected by the sensor, network 112 and enable communication with the backend systems, including, for example, the enterprise server 116 and/or the enterprise system 114.

The mobile device 122 also includes an object list manager module 304 that manages one or more object lists 201, for example, to save, organize, and/or remove the object lists 201. The object list manager module 304 includes object list data 316 and optionally includes object selector application 318. The object list manager 304 also may act as a client application that downloads object lists from the object selector application 202. The object list manager 304 also may enable the object list 201 to be broadcast through the wireless communication interface 302.

The mobile device 122 includes a user interface 308 that allows the user 120 to interact with the mobile device 122. The user interface 308 includes a user input interface 310, such as, for example, a key pad or a touch screen, that allows the user to input commands, and a graphical display 312 that displays information to the user, such as, for example, a display screen of a wireless phone or PDA to display text messages or images that the mobile device 122 receives.

The mobile device 122 also may include a user alert module 314 for generating user alerts, which may alert the user 120 by way of, for example, an alerting sound, vibration of the mobile device 122, or blinking of a light, a combination of the above, or by some other technique. The mobile device 122 also includes an incoming message box 306 configured to hold text messages, alerts, and/or images that the mobile device 122 receives from the sensor network 112.

Figure 4:
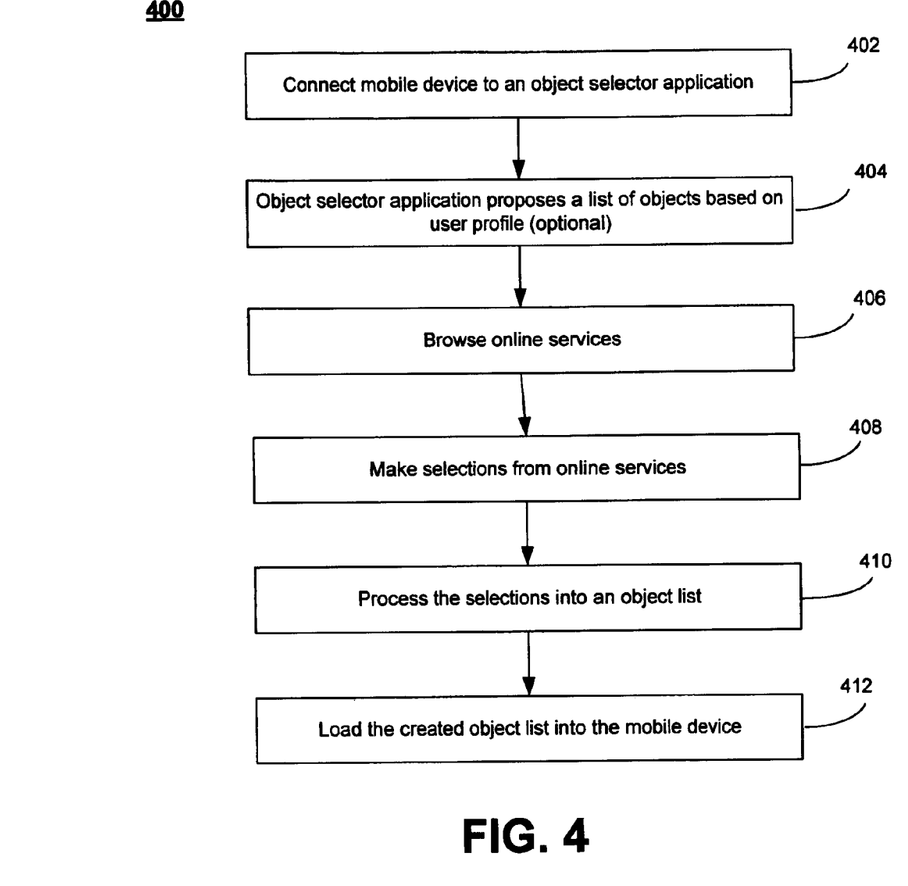
FIG. 4 is a flowchart illustrating an example of a process by which the user creates the object list.

FIG. 4 is a flow chart describing a process 400 of the user 120 in creating the object list 201 for the mobile device 122. The user 120 starts the process 400 by connecting the mobile device 122 to the object selector application 202 (402). For example, the user 120 may connect the mobile device 122 with a computer or computing device that hosts the object selector application 202, and may start the object selector application 202 on the hosting computer/computing device.

Alternatively, the user 120 may start the object selector application 202 directly on the mobile device 122, if, for example, the mobile device 122 is the hosting device for the object selector application 202. The object selector application 202 is connected to the network 204. The network 204 may be, for example, Internet that the hosting computer/computing device connects to, or the network the wireless device communicates. The object selector application 202 is thus "online" and ready to access the online services 206-212 to find desired objects.

In one implementation, the object selector application may propose a list of objects, based on user profile (404). As mentioned above in FIG. 2, the user profile may include typical searches associated with the user 120. For example "newest music CD from band x", or "best selling book of the month."

The object selector application 202 may, for example, run these stored searches in the user profile. As a result, the object selector application 202 may propose a list of objects returned from these searches to the user 120. The object selector application 202 may conduct the searches associated with the user profile each time the object selector application 202 starts, or on a periodical basis, or in response to a user request.

The user 120 then may browse the online services to find desired items through the object selection application 202 (406). The object selector application 202 may provide an integrated interface to access multiple online services to collect information about various items and display this information to the user 120. The object selector application 202 may subscribe to such online services, and may automatically connect and search within these services for a particular user request, and then retrieve an aggregated search result list of items.

For example, the object selector application 202 may subscribe to "onSaleStuff.com", "bestProduct.com" and "mostPopularStuff.com" online information services. When the user 102 searches for "small digital camera" in the object selector application 202, the search string is passed to these three information services, and the object selector application 202 may then display to the user an aggregated result list from the three services. The user 120 may then select one or more items from this aggregated list of digital cameras from the object selector 202.

Additionally, or alternatively, the object selector application 202 may also act as a gateway, through which the user 102 may access and communicate with other online services. For example, the object selector application 202 may have a collection of links to a number of online stores, for example, store1.com, store2.com and store3.com. The user may browse store1.com and selected item 1, 2, and 3 in to the object selector application 202. The user may then browse store2.com and select item 4, and browse store3.com and select item 5 and 6.

After the user 120 browses the items through the object selector application 202 in ways mentioned above, the user may make selections of one or more items (408) and pass these item selections the object selector application 202. The object selector application 202 thus enables the user 120 to shop/browse in many sites (i.e. the online object search services) and put the selected items from multiple sources in one single wish list (i.e. the object list 201), or in a collection of wish lists.

Figure 7:
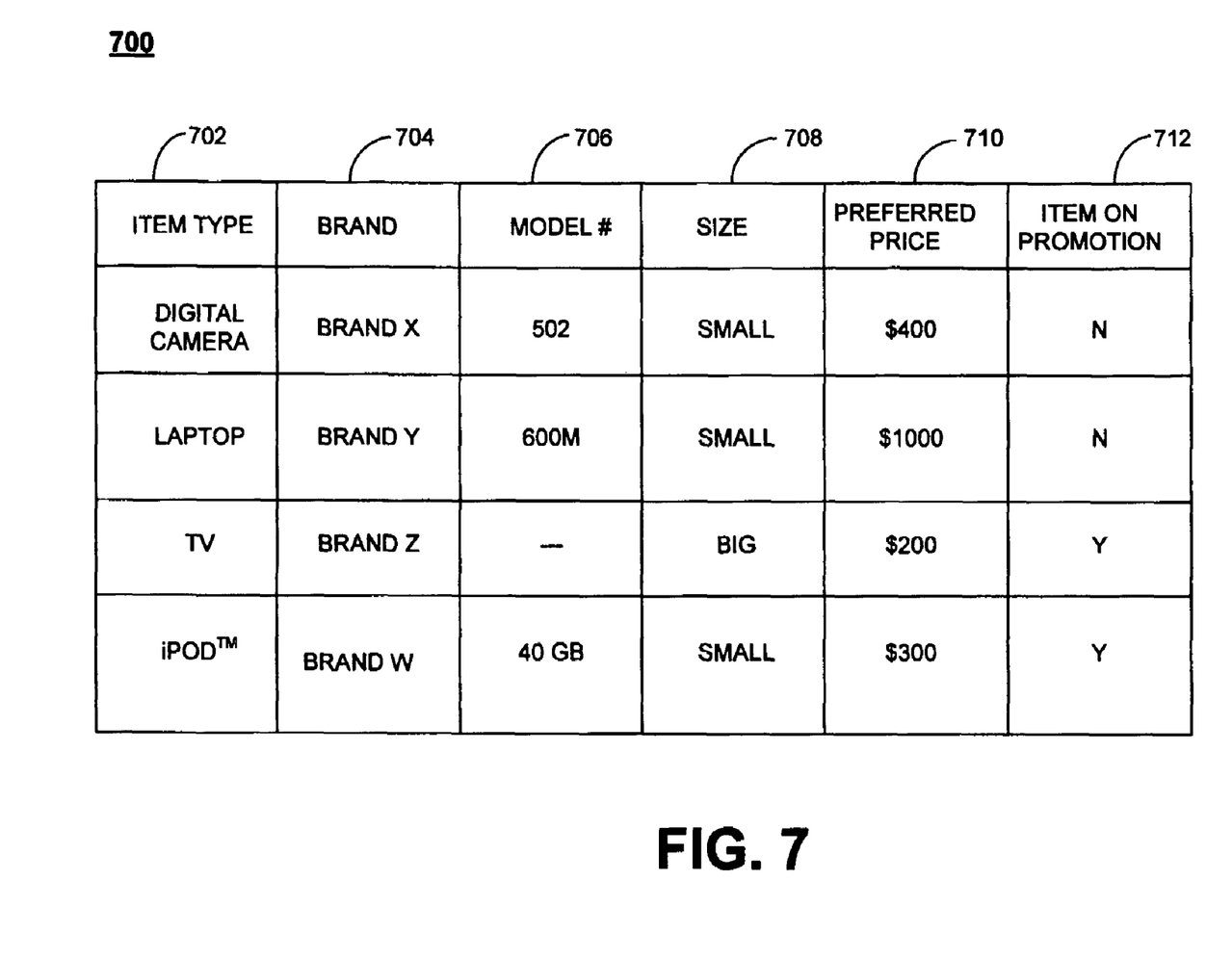
FIG. 7 is a table showing an example of a data structure of the object list of FIGS. 2-4.

The object selector application 202 may process the selected items from multiple sources into the object list 201 (410). The object selector application 202 may parse the item information from multiple sites and consolidate them into the uniformed format of an object, or, in other words, in a data structure that represents an object in the object selector application 202 (an example of which is shown in FIG. 7). The object selector application 202 also may attach additional information to the object, such as, for example, the date/time when the object was selected, the search words the user 120 entered to find the item, and the online resource where the item is found. Such information may help the object selector application 202 to govern the object list 201, for example, to sort the object list 201 by the object creation time, or to sort the object list 201 by a data field of the object record, e.g., by "price" or "size."

The object selector application 202 also may have the ability to store and manage multiple object lists, such as, for example, an object list for shopping during Christmas, an object list for shopping in a vacation resort, or an object list of items to recommend to a friend. The object selector application 202 may manage these object lists and make them easily accessible by the user 120.

Finally in FIG. 4, the object selector application 202 may transfer and/or store one or more object lists 201 to the mobile device 122 (412). For example, the user 120 may click on a "transfer" button within the user interface of the object selector application 202 to initiate a process to transfer a selected object list 201 to the mobile device 122. In another implementation, where the object selector application 202 is running on the mobile device 122, a "save" command allows the user 120 to permanently store the object list 201 on the mobile device 122.

Figure 5:
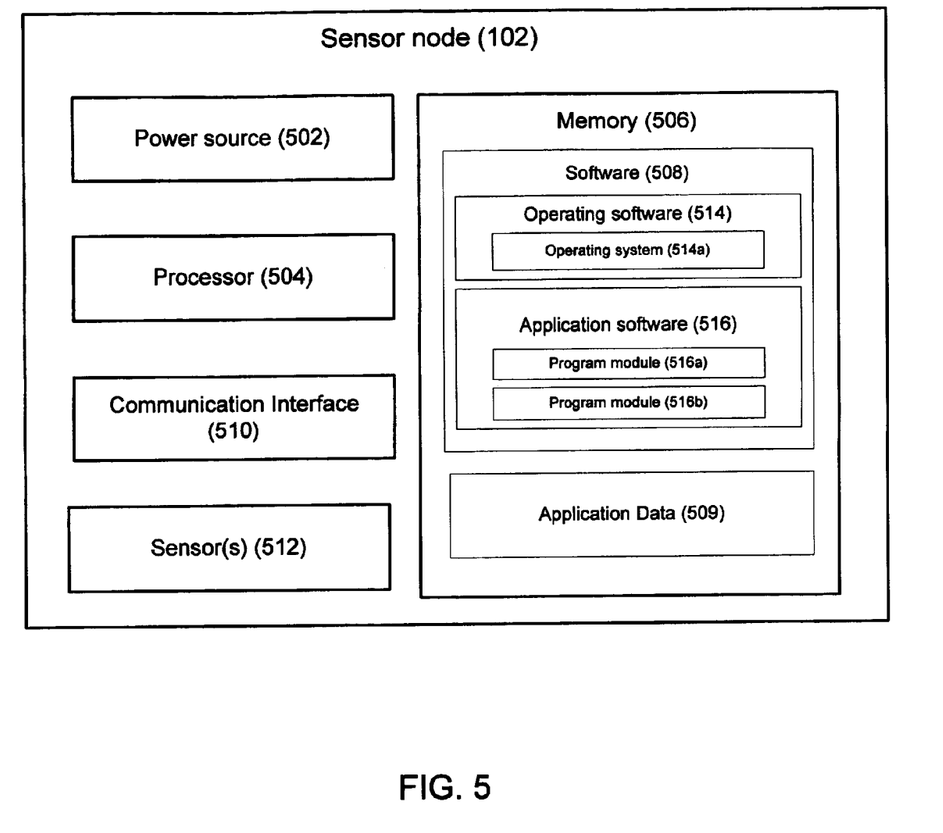
FIG. 5 is a block diagram of a sensor node that may be used in the sensor network of FIG. 1.

FIG. 5 is a block diagram of a sensor node 102 that makes up the sensor network 112. Each sensor node 102 is an electronic device that may have processing, sensing, and/or communication capabilities.

The sensor node 102 includes a power source 502 that provides power for the sensor node 102. The power source 502 may be a battery that is replaced/recharged regularly. The power source 502 also may be a solar cell that is automatically recharged by ambient light. The sensor node 102 includes one or more processors 504 that executes commands or programs in the sensor node 102. The sensor node 102 also includes a memory 506, which may store software programs 508 and application data 509.

The software program 508 may include operating software 514, such as, for example, an operating system 514a, and also may include application software 516. The application software 516 may include one or more program modules, such as, for example, program module 516a and program module 516b.

An example of a program module may be a program that communicates with the mobile device 122 to obtain the objects list 201. Another example of a program module may be a program that relays a list of found objects from the backend system to the mobile device 122. In still another example, a program module may provide routing information for the user 120 to get to a particular sensor node 102. The sensor node 102 may be operable to upload or overwrite one or more program modules in ways of, for example, communicating with the enterprise server 116.

The memory 506 may stores application data 509 that may, for example, be used by the software 508. The application data 509 may include data about the items that are on the shelf (e.g. item quantity, item type, brand, model, size, sale price,) and/or data about the sensor node's physical location, and/or the data of the object lists that are collected from the mobile device 122.

A communication interface 510 in the sensor node 102 allows the sensor node 102 to communicate with the environment, including, for example, the mobile device 122, other sensor nodes 104-108 in the sensor network 112, or the enterprise server 116. The communication interface 510 may include a wireless component (e.g., an antenna). In some implementations, the communication interface 510 also may include a wired component (e.g., an Ethernet line), so that the sensor node 102 may communicate with, for example, the enterprise server 116, over a wired network.

The sensor node 102 also may include one or more sensors 512 that senses and collects data from its physical environment. The sensors 512 may have the ability to, for example, detect if the mobile device 122 is in its vicinity, or collect the object list 201 from the mobile device 122 close by. In other implementations, the sensors 512 may include a Radio Frequency Identifier (RFID) reader for, for example, reading an RFID tag associated with the mobile device 122, or with the user 120. The sensors 512 also may include a digital temperature/humidity sensor, or any other detector/scanner that may report substantially real-time information about the surroundings to the sensor node 102.

Figure 6:
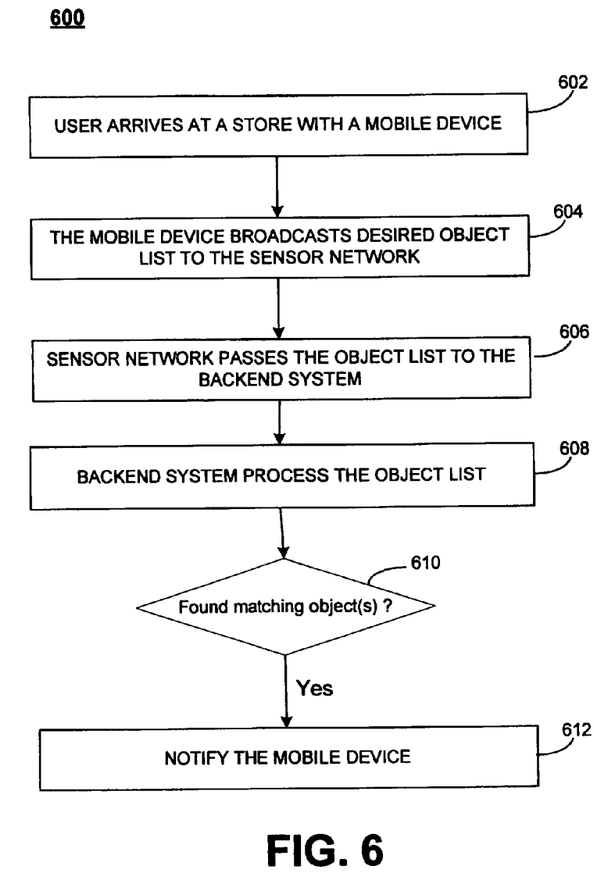
FIG. 6 is a flowchart illustrating an example of a process of a shopping experience wherein the user and the mobile device interact with the sensor network in the retail store environment.

FIG. 6 is a flowchart describing a process 600 of a shopping experience wherein the user 120 and the mobile device 122 interact with the sensor network 112 in the retail environment 101. The user 120 arrives at the retail environment 101 with the mobile device 122, which contains the object list 201 (602).

The user 120 may have created the object list 201 earlier using the object selector application 202, for example, through the process 400 as shown in FIG. 4. The mobile device 122 may constantly broadcast the object list 201 to the sensor network 112 (604) wirelessly, for example, through the wireless communication interface 302. When the user 120 is within the reception range of a sensor node (e.g. the sensor node 102), the sensor node 102 detects the mobile device 122, and may, for example, establish a communication connection with the mobile device 122.

The sensor node 102 receives the object list 201 from the mobile device 122 and routes the object list 201 to the backend system (606). The backend system, i.e. the enterprise server 116 and/or enterprise system 114, may receive the object list 201 from the sensor node 102 directly, or may receive the object list 201 from a close by sensor node 110, where the object list 201 is relayed to by the sensor network 112.

The backend system then processes the object list 201 (608). For example, the enterprise server 116 and/or enterprise system 114 may loop through each entry in the object list 201. For each object, the enterprise server 116 and/or enterprise system 114 may use information about the object included in the object list 201, and/or may look up other related information in the application database 118, in order to determine if there are one or more items that match the desired object and that are in the vicinity of the sensor node 102, or otherwise within the retail environment 101.

When the backend system finds one or more items that matches an object in the object list 201 (610), the backend system may notify the mobile device 122 (612), for example, with an alert. The mobile device 122 may alert the user by, for example, making an alert sound, and/or by vibrating the mobile device 122, and/or by blinking an indicator light. As a result, the user 120 may be reminded to find the reported matching object in its vicinity.

If no matching objects are found (610), then the process may end. In other implementations, the system 100 may alert the mobile device 122 that no items were found, and/or may continue searching the back-end system, or other systems, in case an item becomes available.

Alternatively, or additionally, the user 120 may interact with the enterprise server 116 of the retail environment 101 by requesting more information about the found matching item(s). For example, the user 120 may request routing information to find exactly where the matching item is, or, as another example, may request information as to whether there are any applicable sales or promotions for the matching item.

FIG. 7 is a table 700 showing an exemplary data structure of the object list in the example of the object list 201. The table 700 illustrates a standard format for the object selector application 202 to store item information from multiple online resources. More specifically, the table 700 includes 4 items, i.e. a digital camera, a laptop computer, a television, and an iPOD™ that the user 120 desires to purchase.

Each row represents one object and stores information about the object. Each data field of an object stores a specific feature of the object. Such features may include, for example, the item type 702, item brand 704, model# 706, size 708, preferred price 710, or whether the item is on promotion 712. For example, the object in the first row shows that the user 120 is interested in a digital camera of Brand X, model #502, small in size and with a preferred price of 400$ (or less).

Other data fields may be included. For example, a data field "EPC code" may be included that represents a unique identifier of an item with its electronic product code (EPC). This code may be sufficient for the enterprise system 114 and/or enterprise server 116 to find an exact matching item for the object. If, however, some EPC code data field includes no data, the rest of the data fields may be combined to serve as a searching criteria by the enterprise system 114 and/or enterprise server 116.

As described above, the system 100 or related systems may be used to provide personalized information to a person, within a context in which the information is particularly useful or helpful. In this sense, the primary context discussed herein is the retail environment 101, but, as mentioned, other contexts also may be used.

For example, a sensor network similar to that of the sensor network 112 may be used to detect emergency situations, such as, for example, fire, low oxygen, high/low temperatures, or the presence of carbon monoxide or other poisons. Then, such information may be passed on to the mobile device 122, or to a similar device of someone positioned to assist in the emergency situations, such as, for example, medical personnel. In these cases, personal medical data of the user 120 may be made available to medical personnel, to the advantage of the user 120.

A number of implementations have been described. Nevertheless, it will be understood that various modifications are within the scope of the following claims.

What is claimed is:

1. A system comprising:
    a sensor network including a plurality of sensor nodes distributed over a region, each sensor node monitoring availability information indicating whether items for sale within a vicinity of the sensor node are in stock via wireless communication with the vicinity;
    a memory in communication with the sensor network that stores availability information from the sensor network; and
    a user-detecting node that includes one of the plurality of sensor nodes within the sensor network, the user-detecting node comparing the availability information from the memory with a user preference list obtained from a mobile device within a vicinity of the user-detecting node, and outputting the user preference list and a preference-matched subset to another one of the plurality of sensor nodes, the user preference list including items for purchase, and the preference-matched subset including at least one of the items for sale coinciding with the items for purchase.

2. The system of claim 1 wherein the user-detecting node polls for a signal transmitted by the mobile device, and initiates a message exchange with the mobile device to obtain the user preference list, based on the signal.

3. The system of claim 1 wherein the user-detecting node output outputs directions to the items of the preference-matched subset, with respect to the vicinity of the user-detecting node.

4. The system of claim 1 wherein the user-detecting node outputs directions to the items of the preference-matched subset, with respect to the region defined by the sensor network.

5. The system of claim 4 wherein the user-detecting node communicates with other ones of the plurality of sensor nodes to output the directions with respect to the region.

6. The system of claim 1 wherein the user-detecting node communicates with an external memory to provide the preference-matched subset, and wherein the external memory is associated with a local server computer, a back-end enterprise system, or one of the other ones of the plurality of sensor nodes.

7. The system of claim 1 wherein the preference-matched subset includes a description of the items for sale that coincide with the items for purchase.

8. The system of claim 1 wherein the preference-matched subset includes a description of a substitute item for sale that is determined to be similar to one of the items for purchase.

9. The system of claim 1 wherein the mobile device includes a selector application that selects items for the user preference list from publicly-available item listings.

10. A method comprising:
    detecting a presence of a mobile device within a vicinity of a sensor node that is one of a plurality of sensor nodes of a sensor network, the plurality of sensor nodes located at different locations within a retail environment;
    accessing preference information stored in association with the mobile device and including items for purchase;
    matching, at each of the sensor nodes in succession, information about items for sale within a vicinity of the sensor node with the preference information to determine ones of the items for sale coinciding with the items for purchase;
    determining, based on results of the matching, preference-matched information that reflects collective knowledge of the sensor network about availability of the items for purchase within the retail environment; and
    outputting the preference-matched information to the mobile device.

11. The method of claim 10 wherein detecting the presence of the mobile device comprises detecting a signal transmitted by the mobile device.

12. The method of claim 11 wherein accessing the preference information comprises conducting a message exchange in which the preference information stored on the mobile device is received at the sensor node.

13. The method of claim 10 wherein outputting the preference-matched information comprises outputting directions, within the environment of the sensor network, to the ones of the items for sale that coincide with the items of interest.

14. An apparatus comprising a storage medium having instructions stored thereon, the instructions including:
    a first code segment associated with a sensor node of a sensor network, the first code segment for monitoring whether items for sale within a vicinity of the sensor node are in stock based on information wireles sly received from the vicinity;
    a second code segment associated with the sensor node, the second code segment for receiving an item list from a mobile device, the item list reflecting a preference of a user of the mobile device;
    a third code segment for comparing the item information with the item list to obtain preference-matched item information; and
    a fourth code segment for outputting the preference-matched item information and the item list to a different sensor node of the sensor network, the different sensor node monitoring whether items for sale within a vicinity of the different sensor node are in stock.

15. The apparatus of claim 14 wherein the first code segment includes a fifth code segment for communicating with another one of a plurality of sensor nodes within the sensor network, or with an external application, to obtain the item information.

16. The apparatus of claim 14 wherein the fourth code segment includes a fifth code segment for outputting descriptive information regarding a nature or location of an item in the preference-matched item information.

17. The apparatus of claim 14 wherein the fourth code segment includes a fifth code segment for outputting a notification event to the mobile device when the mobile device is in a vicinity of an item from the preference-matched item information.

18. A system comprising:
    a sensor network including a plurality of wirelessly-linked sensor nodes located at a plurality of different product shelves in a retail environment, each sensor node having real-time availability information indicating the current stock of products at its respective product shelf, the plurality of sensor nodes including:
        a user-detecting sensor node, at a first product shelf, that receives a user preference list from a mobile device within a vicinity of the first product shelf, the user preference list including products of interest, and
        a neighboring sensor node, at a second product shelf other than the first product shelf, the neighboring sensor node configured to:
            receive the user preference list from the user-detecting sensor node,
            compare the current stock of products at the second product shelf with the user preference list, and
            output to the sensor network a preference-matched subset, the preference-matched subset including at least one product that is currently stocked at the second product shelf and that coincides with at least one of the products of interest on the user preference list.

19. The system of claim 18, wherein the user-detecting sensor node is configured to:
    compare the current stock of products at the first product shelf with the user preference list; and
    output a preference-matched subset to the neighboring sensor node along with the user preference list, the preference-matched subset from the user-detecting senor node including at least one product that i) is currently stocked at the first product shelf, ii) is different than the at least one product included in the preference-matched subset of the neighboring sensor node, and iii) coincides with at least one of the products of interest on the user preference list.

* * * * *